US008305501B2

(12) United States Patent
Obara (10) Patent No.: US 8,305,501 B2
(45) Date of Patent: Nov. 6, 2012

(54) ELECTRONIC APPARATUS AND METHOD OF PRESETTING RECEPTION CHANNEL

(75) Inventor: Mitsuhiko Obara, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/007,426

(22) Filed: Jan. 14, 2011

(65) Prior Publication Data

US 2011/0176062 A1     Jul. 21, 2011

(30) Foreign Application Priority Data

Jan. 15, 2010    (JP) ................................. 2010-007368

(51) Int. Cl.
  *H04N 5/44* (2006.01)
  *H04N 5/50* (2006.01)
  *H04L 27/08* (2006.01)
  *H04B 1/06* (2006.01)

(52) U.S. Cl. ........ 348/731; 348/725; 348/735; 375/345; 455/232.1

(58) Field of Classification Search .................. 348/725, 348/731, 735; 375/345; 455/232.1
  See application file for complete search history.

(56) References Cited

U.S. PATENT DOCUMENTS

| 5,368,141 | A  | * | 11/1994 | Clarke ........................... 188/284 |
| 5,940,748 | A  | * | 8/1999  | Daughtry et al. ........... 455/182.2 |
| 6,400,933 | B1 | * | 6/2002  | Mensink et al. ........... 455/179.1 |
| 6,904,274 | B2 | * | 6/2005  | Simmons et al. .......... 455/245.1 |
| 7,116,165 | B2 | * | 10/2006 | Kwong ......................... 330/129 |
| 7,185,242 | B2 | * | 2/2007  | Chun ............................ 714/704 |

(Continued)

FOREIGN PATENT DOCUMENTS

EP     1 995 898 A2    11/2008

(Continued)

OTHER PUBLICATIONS

Notice of Reasons for Rejection mailed by the Japan Patent Office on May 17, 2011 in corresponding Japanese application No. 2010-007368 in 7 pages.

(Continued)

*Primary Examiner* — Brian Yenke
(74) *Attorney, Agent, or Firm* — Knobbe, Martens, Olson & Bear, LLP (57) ABSTRACT

According to one embodiment, an electronic apparatus includes an input module, a tuner, an amplifier and a preset module. The input module receives a television broadcast signal. The tuner selects a television broadcast signal of a target channel from television broadcast signals of channels receivable by way of the input module. The amplifier amplifies the television broadcast signal supplied to the tuner. The preset module determines whether each of the channels is receivable or unreceivable and to turn on or turn off of the amplifier, based on a first reception status information of the television broadcast signal of the reception channel acquired from the tuner in a state that the amplifier is on and a second reception status information of the television broadcast signal of the reception channel acquired from the tuner in a state that the amplifier is off.

4 Claims, 3 Drawing Sheets

U.S. PATENT DOCUMENTS

| | | | |
|---|---|---|---|
| 7,408,594 B2 * | 8/2008 | Nor | 348/731 |
| 7,420,627 B2 * | 9/2008 | Takagi et al. | 348/725 |
| 7,640,572 B2 * | 12/2009 | Tan et al. | 725/151 |
| 7,715,506 B2 * | 5/2010 | Kim | 375/346 |
| 7,787,060 B2 * | 8/2010 | Kim | 348/730 |
| 7,808,562 B2 * | 10/2010 | Yen | 348/732 |
| 2004/0029537 A1 * | 2/2004 | Pugel et al. | 455/115.1 |
| 2004/0036772 A1 * | 2/2004 | Pugel et al. | 348/180 |
| 2004/0041945 A1 * | 3/2004 | Pugel et al. | 348/470 |
| 2004/0259516 A1 * | 12/2004 | Hwang et al. | 455/234.1 |
| 2005/0162570 A1 * | 7/2005 | Hall et al. | 348/735 |
| 2005/0285979 A1 * | 12/2005 | Tan et al. | 348/731 |
| 2006/0038924 A1 * | 2/2006 | Kitaguchi | 348/705 |
| 2006/0141965 A1 * | 6/2006 | Hennig | 455/247.1 |
| 2006/0158376 A1 * | 7/2006 | Kaneko | 342/464 |
| 2007/0046832 A1 * | 3/2007 | Kim | 348/730 |
| 2007/0147553 A1 * | 6/2007 | Bhat et al. | 375/345 |
| 2008/0178250 A1 * | 7/2008 | Fukui | 725/139 |
| 2008/0225176 A1 * | 9/2008 | Selby et al. | 348/572 |
| 2008/0225182 A1 * | 9/2008 | Silver et al. | 348/726 |
| 2009/0322963 A1 | 12/2009 | Furuya et al. | |
| 2010/0210228 A1 * | 8/2010 | Ishida et al. | 455/179.1 |
| 2010/0289967 A1 * | 11/2010 | Uchida | 348/735 |

FOREIGN PATENT DOCUMENTS

| | | |
|---|---|---|
| JP | H01-39021 Y | 11/1989 |
| JP | 05-083152 | 4/1993 |
| JP | 3019106 U | 12/1995 |
| JP | 10-163817 | 6/1998 |
| JP | 11-088796 | 3/1999 |
| JP | 2005-020302 | 1/2005 |
| JP | 2006-050585 | 2/2006 |
| JP | 2007-174101 | 7/2007 |
| JP | 2008-294614 | 12/2008 |
| JP | 2009-016912 | 1/2009 |
| JP | 2010-011402 | 1/2010 |

OTHER PUBLICATIONS

Suzuye & Suzuye, "Information Sheet for preparing an Information Disclosure Statement under Rule 1.56," undated.

* cited by examiner

ELECTRONIC APPARATUS AND METHOD OF PRESETTING RECEPTION CHANNEL

CROSS-REFERENCE TO RELATED APPLICATIONS

This application is based upon and claims the benefit of priority from Japanese Patent Application No. 2010-007368, filed Jan. 15, 2010, the entire contents of which are incorporated herein by reference.

FIELD

Embodiments described herein relate generally to a technique of presetting a reception channel, which is preferable to a personal computer including a television function for watching, recording and reproducing television broadcast program data.

BACKGROUND

In recent years, battery-powered and portable personal computers show a tendency to be classified into the following two models. For example, one is a low-price model, which is configured to achieve the purpose only of operating basic software such as a browser, a mailer and a text editor. The other is a high-functional model, which is capable of enjoying an AV (audio and visual) content) with high definition and high sound quality using a large screen. Of the foregoing high-functional mode personal computers, several personal computers include a television function for watching, recording and reproducing television broadcast program data.

A personal computer including a television function is provided with a terminal for making a connection with an antenna and a television tuner unit for selecting a target channel from a plurality of channels. Further, the personal computer includes a preset function of searching (called as channel scan and channel search) and setting channels receivable in a local area where users use the personal computer. In general, the television tuner unit includes a built-in amplifier (gain control circuit) for receiving a television broadcast signal of each channel at a suitable level under the environment that users use a personal computer. Various proposals for a gain control method by the amplifier have been made so far (e.g., see Jpn. Pat. Appln. KOKAI Publication No. 2005-20302).

The foregoing Publication No. 2005-20302 discloses a television broadcast signal receiver. The television broadcast signal receiver previously stores gain setting information of an automatic gain control (AGC) amplifier. Further, the receiver determines and changes the gain of the foregoing AGC amplifier every reception channel based on reception information obtained in channel search and the gain setting information.

The foregoing television broadcast signal receiver disclosed in the Publication No. 2005-20302 determines a gain setting value (gain value) of the AGC amplifier from an input level only. For this reason, if multi-wave interference distortion occurs, it is difficult to prevent radio interference that determination of the gain value becomes complicated.

More specifically, the foregoing multi-wave interference distortion is radio interference having an influence to a reception channel when the input level of other channels is high and the number of channels is great. Therefore, if gain is set on based on the matter that the input level of the reception channel is small, the following problem arises. Specifically, if the foregoing multi-wave interference distortion exists, signals of other channels are amplified; as a result, this is a factor of generating radio interference.

Namely, a television tuner unit including a gain control function conventionally executes reception in the following manner. Specifically, the unit determines a gain control value based on reception status information obtained in channel scan, and then, sets the gain control value in the actual channel reception. For example, status information related to an input level is acquired as the reception status information. If the input level is high, gain is set off; conversely, if it is low, gain is set on. Thus, reception performance is set in accordance with the strength of an electric field.

However, distortion occurs in a reception channel radiowave due to an influence by signals of many channels except a reception channel; as a result, radio interference is generated (i.e., the foregoing multi-wave interference distortion). Therefore, it is difficult to securely prevent the foregoing radio interference without causing an error based on the input level only because determination of the actual gain value is complicated. In view of the foregoing circumstances, it is desired to provide a method of more securely prevent radio interference such as multi-wave interference distortion in which determination of the actual gain value is complicated, without increasing time spent for channel scan (i.e., time spent for determining a gain value of each channel).

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, an electronic apparatus includes an input module, a tuner, an amplifier and a preset module. The input module is configured to receive a television broadcast signal. The tuner is configured to select a television broadcast signal of a target channel from television broadcast signals of channels receivable by way of the input module. The amplifier is configured to amplify the television broadcast signal supplied to the tuner. The preset module is configured to determine whether each of the channels is receivable or unreceivable and to turn on or turn off of the amplifier, based on a first reception status information of the television broadcast signal of a reception channel acquired from the tuner in a state that the amplifier is on and a second reception status information of the television broadcast signal of the reception channel acquired from the tuner in a state that the amplifier is off.

Figure 1:
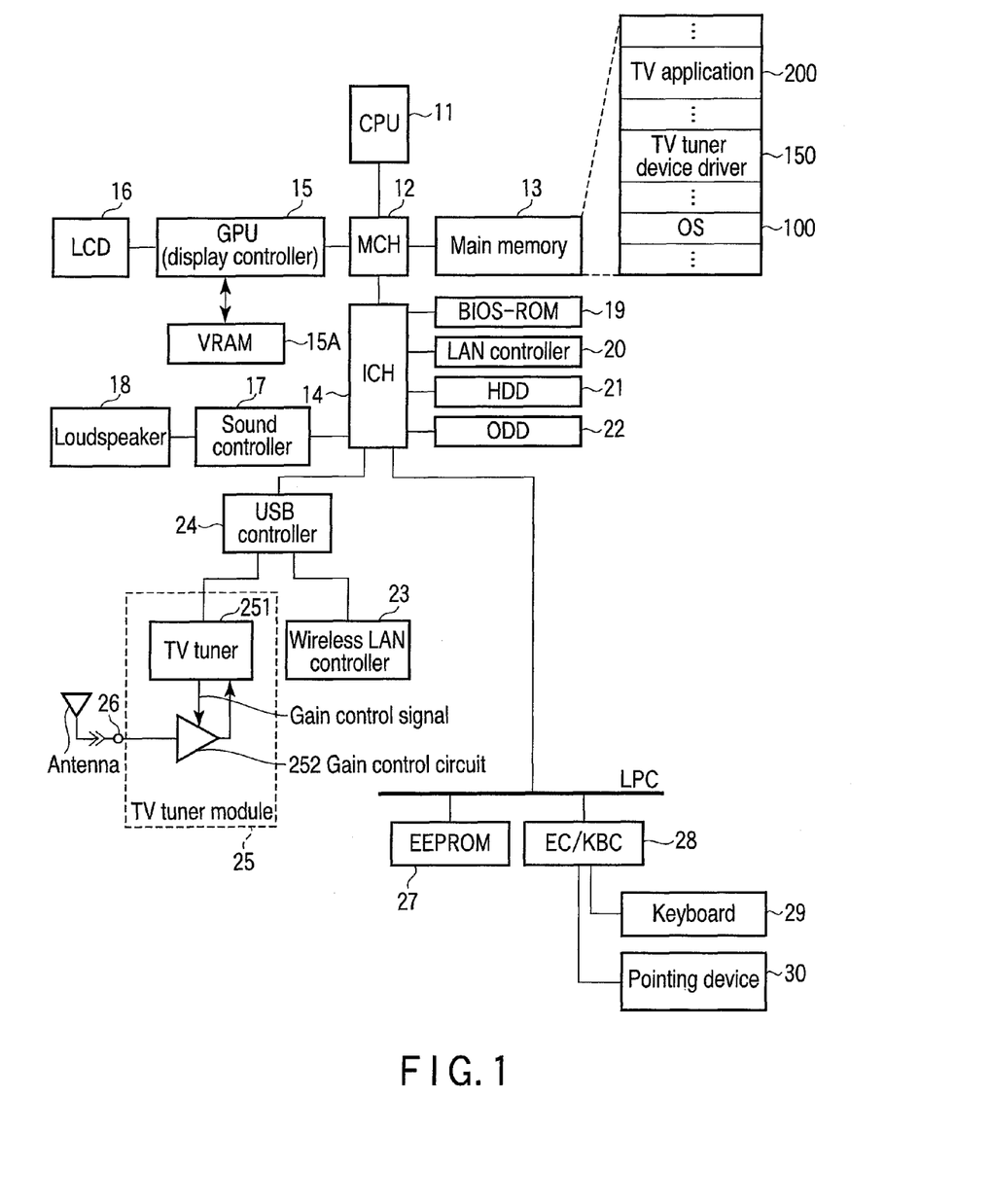
FIG. 1 is an exemplary view showing the system configuration of an electronic apparatus according to an embodiment.

FIG. 1 is an exemplary view showing the system configuration of an electronic apparatus according to an embodiment. The electronic apparatus is realized as a notebook personal computer, for example. As shown in FIG. 1, the electronic apparatus includes a central processing unit (CPU) 11, a memory controller hub (MCH) 12, a main memory 13, an I/O controller hub (ICH) 14 and a graphics processing unit (GPU [display controller]) 15. Further, the electronic apparatus includes a video memory (VRAM) 15A, a liquid crystal display (LCD) 16, a sound controller 17, a speaker 18, a Basic Input/Output System (BIOS) read-only memory (ROM) 19 and a local area network (LAN) controller 20. Further, the electronic apparatus includes a hard disk drive (HDD) 21, an optical disc drive (ODD) 22, a wireless LAN controller 23, a Universal Serial Bus (USB) controller 24, and a television tuner module 25. Further, the electronic apparatus includes an antenna terminal 26, an electrically erasable programmable ROM (EEPROM) 27, an embedded controller/keyboard controller (EC/KBC) 28, a keyboard 29 and a pointing device 30.

The CPU 11 is a processor, which controls the operation of the electronic apparatus. The CPU 11 executes various programs loaded from HDD 21 and ODD 22 to the main memory 13. The various programs executed by the CPU 11 include an operating system (OS) 100, which controls resource management, a television tuner device driver 150 and a television application program described later, which are operated under the control of the OS 100. Further, the CPU 11 executes a BIOS stored in the BIOS-ROM 19. The BIOS is a program for controlling hardware.

The MCH 12 operates as a bridge, which makes a connection between the CPU 11 and the ICH 14, and in addition, operates as a memory controller for performing access control of the main memory 13. Moreover, the MCH 12 includes a function of performing a communication with the GPU 15.

The GPU 15 is a display controller, which controls the LCD 16. The GPU 15 includes a video memory, that is, VRAM 15A. Further, the GPU 15 is equipped with an accelerator, which draws images displayed by various programs in place of the CPU 11.

The ICH 14 controls each USB-connected USB device and each device on a Low Pin Count (LPC) bus. The ICH 14 includes a built-in Integrated Device Electronics (IDE) controller for controlling HDD 21 and ODD 22. Moreover, the ICH includes a function of performing communications with the sound controller 17 and the LAN controller 20.

The sound controller 17 is a sound source device, and outputs an audio data given as a reproduction target of various programs to the loudspeaker 18.

The LAN controller 20 is a wired communication device, which performs a wired communication conforming to the IEEE 802.3 standard, for example. On the other hand, the wireless LAN controller 23 is a wireless communication device, which performs a wired communication conforming to the IEEE 802.11 standard, for example. The USB controller 24 performs a communication with an external apparatus by way of a serial bus conforming to the USB 2.0 standard, for example. FIG. 1 shows an example in which the USB controller 24 is provided independently from the ICH 14. In this case, the configuration that the USB controller 24 is built in the ICH 14 may be employed.

The television tuner module 25 is a unit for selecting a television broadcast signal of a target channel from television broadcast signals of a plurality of channels, and receiving the selected signal. The television tuner module 25 is connected to the antenna terminal 26. The television tuner module 25 includes a television tuner 251 and a gain control circuit 252. Gain by the gain control circuit 252 is changed into on or off according to a gain control signal supplied from the television tuner 251 to the gain control circuit 252. Namely, the television tuner module 25 includes a gain control function.

The foregoing television tuner device driver 150 is a program for controlling the television tuner module 25 given as hardware using software. The foregoing television application program 200 is a program for providing a television function of watching, recording and reproducing television broadcast program data by controlling the television tuner module 25 by way of the television tuner device driver 150. More specifically, the television application program 200 executes the following processing. One is live reproduction processing for watching television broadcast program data received by the television tuner module 25. Another is recording processing of recording received television broadcast program data in the HDD 21. Yet another is reproduction processing of reproducing television broadcast program data recorded on the HDD 21.

The television tuner device driver 150 includes a preset function of searching (channel scan, channel search) a channel receivable in a local area where users use this electronic apparatus, and setting the receivable channel. Further, the driver 150 includes a function of determining whether gain by the gain control circuit 252 is set to any of on or off with respect to each of receivable channels in the foregoing preset. The electronic apparatus is configured so that the television tuner device driver 150 realizes the following functions. Namely, the driver 150 restricts an increase of time spent for channel scan (i.e., time spent for determining gain on or off by the gain control circuit 252 for each channel). Further, the driver 150 suitably determines whether gain by the gain control circuit 252 should be set to any of on or off to realize multi-wave interference processing in addition to strong and weak electric-field processing. The details of the foregoing point will be described below.

The EEPROM 27 is a memory device for storing identification data of the electronic apparatus, for example. The EC/KBC 28 is a single-chip microprocessing unit (MPU), which is integrated with an embedded controller for executing a power management and a keyboard controller for controlling a data input by operating the keyboard 29 and the pointing device 30.

The basic principle of determining the gain control in channel scan of the electronic apparatus having the foregoing configuration will be explained below.

First, in order to facilitate the understanding of a gain control determination method of this embodiment, the problem of a conventional gain control determination method will be explained below with reference to FIG. 2.

Figure 2:
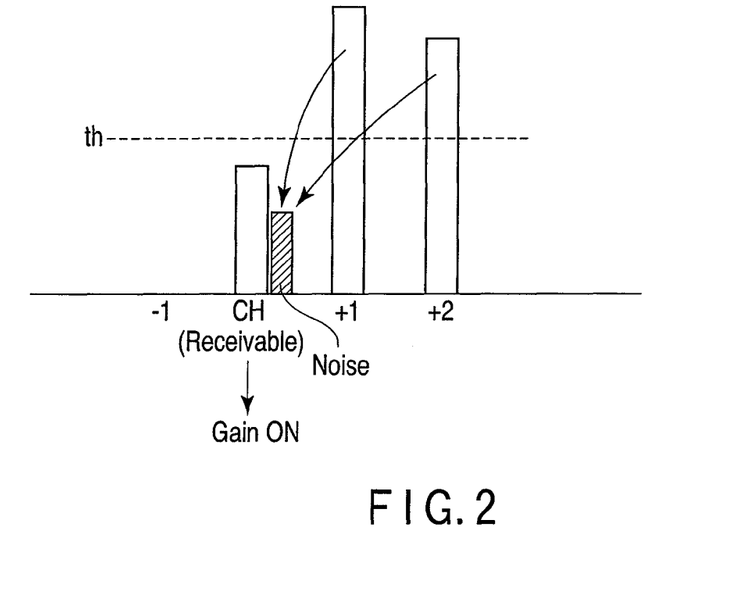
FIG. 2 is an exemplary view to explain a problem of a conventional method of determining gain control.

As shown in FIG. 2, an input level of a reception channel is set less than predetermined one threshold (th). Further, an environment is set such that an influence by signals of other channels, that is, noise is generated at a high level, and thus, multi-wave interference distortion exists. The foregoing case is given; nevertheless, conventionally, gain is set to on according to the condition only that an input level of a reception channel is less than a threshold (th), that is, strong and weak electric-field processing only. However, in such a case, signals (noise) of other channels are amplified; as a result, radio interference is generated.

Figure 3:
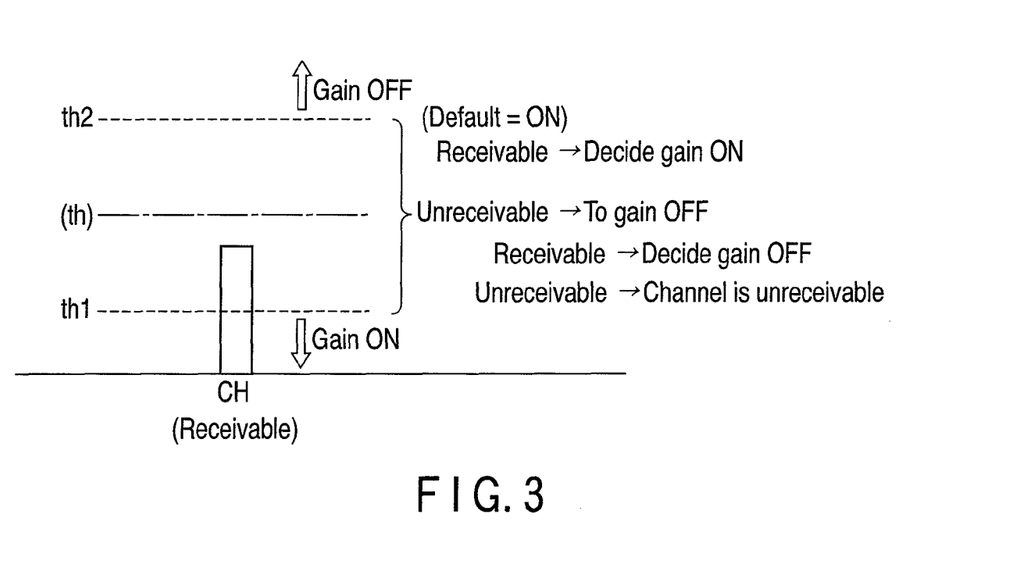
FIG. 3 is an exemplary view to explain a method of determining gain control in the electronic apparatus according to the embodiment.

In order to solve the foregoing problem, the following setting is made in the electronic apparatus of this embodiment. Specifically, as seen from FIG. 3, two thresholds (th1, th2) for determining the magnitude of an input level of a reception channel are set. For example, threshold th1 is defined as a weak electric-field level, which is not apparently receivable unless gain is set to on. Threshold th2 is defined as a strong electric-field level, which is not apparently receivable unless gain is set to off. Namely, there exists a relation of threshold th1<threshold th2. In FIG. 3, the foregoing conventional one threshold (th) is shown together for reference.

The television tuner device driver 150 successively gives the following instruction to the television tuner module 25. According to the foregoing instruction, the frequency of a reception channel is set in the direction from a low frequency toward a high frequency of a frequency band used as a carrier wave of a television broadcast signal. When giving the foregoing instruction, the driver 150 gives instructions to set gain to on together. Namely, a state that gain is set to on is defined as a gain control default preset value of each channel. The foregoing preset is carried out, and then, the driver 150 acquires reception status information from the television tuner module 25.

The foregoing reception status information includes input level information of a television broadcast signal and receivable/unreceivable state information. The tuner module 25 uses the intensity of electric field as the input level information, and then, includes it in the reception status information. For example, a flag showing whether an error rate of a television broadcast signal is less than a predetermined value (receivable) or not (unreceivable) is included as receivable/unreceivable state information in the reception status information.

If an input level of a reception channel is less than threshold th1, the television tuner device driver 150 makes a decision of setting gain to on with respect to the reception channel at that time. Then, the driver 150 checks whether the reception channel is receivable or unreceivable using the foregoing receivable/unreceivable state information. If the reception channel is receivable, the driver 150 adds the reception channel as a receivable channel to a preset target (in a state of setting gain to on). Conversely, if the reception channel is unreceivable, the driver 150 excludes the reception channel from a preset target.

Moreover, if an input level of a reception channel exceeds threshold th2, the television tuner device driver 150 makes a decision of setting gain to off with respect to the reception channel at that time. Then, the driver 150 gives instructions to set gain to off to the television tuner module 25. The module 25 executes the foregoing setting, and thereafter, the driver 150 newly acquires reception status information from the television tuner module 25.

If receivable/unreceivable state information included in the newly acquired reception status information shows receivable, the television tuner device driver 150 adds the reception channel as a receivable channel to a preset target (in a state of setting gain to off). Conversely, if the foregoing information shows unreceivable, the driver 150 excludes the reception channel from a preset target.

The case except the foregoing cases, that is, if an input level of a reception channel is greater than threshold th1 and less than threshold th2, the television tuner device driver 150 executes the following operation. Namely, the driver 150 checks whether a reception channel is receivable or unreceivable using receivable/unreceivable state information included in reception status information acquired in a default state that gain is set to on. If a reception channel is receivable, the driver 150 adds the reception channel as a receivable channel to a preset target (in a state of setting gain to on).

Conversely, if the reception channel is unreceivable, the television tuner device driver 150 gives instructions to set gain to off to the television tuner module 25. Then, the module 25 executes the foregoing setting, and thereafter, the driver 150 newly acquires reception status information from the television tuner module 25. Then, the driver 150 checks whether or not a reception channel is receivable using receivable/unreceivable state information included in the newly acquired reception status information. If the reception channel is receivable, the driver 150 adds the reception channel as a receivable channel to a preset target (in a state of setting gain to off). Conversely, if the reception channel is unreceivable, the driver 150 excludes the reception channel from a preset target.

For example, as shown in FIG. 2, when a channel is in a state that multi-wave interference distortion exists at a rather weak electric-field level, if gain is set to on, the following problem arises. Specifically, resulting from a relation with noise, the error rate of a television broadcast signal becomes high all the more; as a result, there is a possibility that the foregoing signal is unreceivable. The electronic apparatus of this embodiment sets gain to off to retry a check whether or not a channel is receivable in the following case. Namely, if gain is set to on, a channel is unreceivable (when a channel is in a state that an input level is greater than threshold th1 and less than threshold th2). Therefore, when gain is set to off, if a channel is receivable, the channel is added to a preset target under a suitable condition. In addition, when gain is set to off, if the channel is unreceivable, the channel, which is not correctly receivable even if gain control is carried out, is securely excluded from a preset target. In other words, this serves to realize gain control capable of following multi-wave interference processing in addition to strong and weak electric-field processing.

Moreover, a channel having an input level, which is greater than threshold th1 and less than threshold th2, narrows down to a channel having a possibility that multi-wave interference distortion is generated. This serves to restrict an increase of time spent for channel scan (i.e., to suitably execute multi-wave interference processing.

Figure 4:
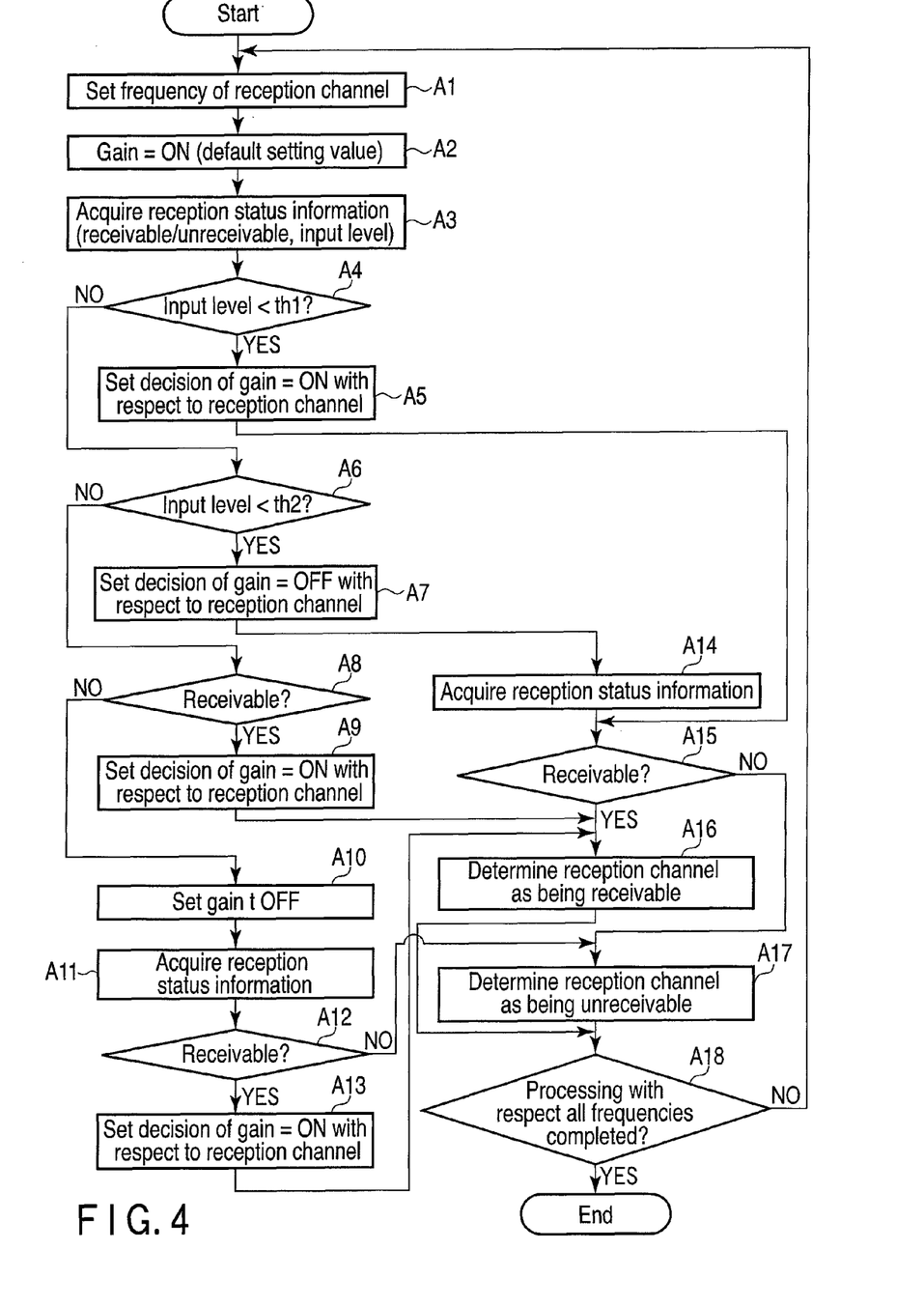
FIG. 4 is an exemplary flowchart showing a gain control procedure in channel scan of the electronic apparatus according to the embodiment.

FIG. 4 is an exemplary flowchart showing a gain control procedure in channel scan of an electronic apparatus according to an embodiment.

The television tuner device driver 150 gives instruction to set a frequency of a reception channel to the television tuner module 25 (block A1). Further, the driver 150 gives instructions to set gain to on to the television tuner module 25 (block A2). The television tuner module 25 executes the foregoing setting, and thereafter, the driver 150 acquires reception status information (first reception status information) from the television tuner module 25 (block A3).

When acquiring the reception status information, the television tuner device driver 150 checks whether or not an input level is less than threshold th1 (block A4). If the input level is less than threshold th1 (YES in block A4), the driver 150 makes a decision of setting gain to on with respect to the reception channel (block A5). Further, the driver 150 checks whether or not the reception channel is in a receivable state (block A15). If the reception channel is in a receivable state (YES in block A15), the driver 150 determines that the reception channel is receivable (block A16). Conversely, if the reception channel is in an unreceivable state (NO in block A15), the driver 150 determines that the reception channel is unreceivable (block A17).

Conversely, if the input level is not less than threshold th1 (NO in block A4), the television tuner device driver 150 checks whether or not the input level exceeds threshold th2 (block A6). If the input level exceeds threshold th2 (YES in block A6), the driver 150 makes a decision of setting gain to off with respect to the reception channel (block A7). In this case, the driver 150 gives instructions to again set gain to off to the television tuner module 25. The television tuner module 25 executes the foregoing setting, and thereafter, the driver 150 newly acquires reception status information (second reception status information) from the television tuner module 25 (block A14).

The television tuner device driver 150 checks whether or not a reception channel is in a receivable state from the foregoing newly acquired reception status information (block A15). If the reception channel is in a receivable state (YES in block A15), the driver 150 determines that the reception channel is receivable (block A16). Conversely, if the reception channel is in an unreceivable state (NO in block A15), the driver 150 determines that the reception channel is unreceivable (block A17).

If an input level is not less than threshold th1 and does not exceed threshold th2 (NO in block A4 and NO in block A6), the television tuner device driver 150 checks whether or not a reception channel is in a receivable state from reception status information acquired at that time (block A8). If the reception channel is in a receivable state (YES in block A8), the driver 150 makes a decision of setting gain to on (block A9), and thus, determines that the reception channel is receivable (block A16).

Conversely, if the reception channel is in an unreceivable state (NO in block A8), the television tuner device driver 150 gives instructions to again set gain to off to the television tuner module 25 (block A10). The television tuner module 25 executes the foregoing setting, and thereafter, the driver 150 newly acquires reception status information (second reception status information) from the television tuner module 25 (block A11). Then, the driver 150 checks whether or not a reception channel is a receivable state from the forgoing newly acquired reception status information (block A12). If the reception channel is in a receivable state (YES in block A12), the driver 150 makes a decision of setting gain to off (block A13), and then, determines that the reception channel is receivable (block A16). Conversely, if the reception channel is in an unreceivable state (NO in block A12), the driver 150 determines that the reception channel is unreceivable (block A17).

The foregoing procedures from blocks A1 to A17 are carried out with respect to one channel to determine whether or not the channel is receivable and to make a decision of gain on/off. Thereafter, the television tuner device driver 150 determines whether or not processing with respect to all frequencies is completed (block A18). If a non-processing channel remains (NO in block A18), the procedures from block A1 are repeated with respect to the remaining channel. If processing with respect to all channels is completed (YES in block A18), channel scan ends.

As described above, the electronic apparatus of this embodiment prevents an increase spent for channel scan, and realizes suitable gain control capable of executing multi-wave interference processing in addition to strong and weak electric-field processing.

This embodiment shows an example in which a state that gain is set to on is defined as a gain control default setting value of each channel. Of course, a state that gain is set to off may be defined as a gain control default setting value of each channel. In this case, the following procedure is taken. Specifically, a channel only having an input level, which is greater than threshold th1 and less than threshold th2 is defined as a target. Then, gain is set to on with respect to a channel, which is unreceivable if gain is off, and thus, determination whether or not the channel is receivable is retried.

According to this embodiment, a personal computer including a television function is given as an example. In this case, a gain control determination method of this embodiment is applicable to general television receivers, of course.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
an input module configured to receive a television broadcast signal;
a tuner configured to select a television broadcast signal of a target channel from television broadcast signals of channels receivable by way of the input module, and to receive the selected broadcast signal;
an amplifier configured to be interposed between the input module and the tuner, and to amplify the television broadcast signal supplied to the tuner; and
a preset module configured to determine whether each channel is receivable or unreceivable and to set on or off of the amplifier,
wherein the preset module comprises:
a first determination module configured:
to set the amplifier to on;
to make a decision of setting the amplifier to on with respect to the reception channel while determining that the reception channel is receivable if receivable/unreceivable state information included in reception status information of the television broadcast signal obtained from the tuner indicates a receivable state when input level information included in the reception status information is less than a first threshold in the case where the amplifier is set to on; and
to determine that the reception channel is unreceivable if the receivable/unreceivable state information indicates an unreceivable state when the input level information is less than the first threshold in the case where the amplifier is set to on;
a second determination module configured:
to reset the amplifier to off when the input level information exceeds a second threshold greater than the first threshold in the case where the amplifier is set to on;
to make a decision of setting the amplifier to off with respect to the reception channel while determining that the reception channel is receivable if the receivable/unreceivable state information indicates the receivable state in the case where the amplifier is reset to off; and
to determine that the reception channel is unreceivable if the receivable/unreceivable state information indicates the unreceivable state in the case where the amplifier is reset to off; and
a third determination module configured:
to make a decision of setting the amplifier to on with respect to the reception channel while determining that the reception channel is receivable if the receivable/unreceivable state information indicates the receivable state when the input level information is not less than the first threshold and not greater than the second threshold in the case where the amplifier is set to on;

to reset the amplifier to off if the receivable/unreceivable state information indicates the unreceivable state when the input level information is not less than the first threshold and not greater than the second threshold in the case where the amplifier is set to on;

to make a decision of setting the amplifier to off with respect to the reception channel while determining that the reception channel is receivable if the receivable/unreceivable state information indicates the receivable state in the case where the amplifier is reset to off; and to determine that the reception channel is unreceivable if the receivable/unreceivable state information indicates the unreceivable state in the case where the amplifier is reset to off.

2. A method of presetting a reception channel for an electronic apparatus comprising an input module configured to receive a television broadcast signal, a tuner configured to select a television broadcast signal of a target channel from television broadcast signals of channels receivable by way of the input module and to receive the selected broadcast signal, and an amplifier configured to be interposed between the input module and the tuner and to amplify the television broadcast signal supplied to the tuner, the method comprising:

setting the amplifier to on, making a decision of setting the amplifier to on with respect to the reception channel while determining that the reception channel is receivable if receivable/unreceivable state information included in reception status information of the television broadcast signal obtained from the tuner indicates a receivable state when input level information included in the reception status information is less than a first threshold in the case where the amplifier is set to on, and determining that the reception channel is unreceivable if the receivable/unreceivable state information indicates an unreceivable state when the input level information is less than the first threshold in the case where the amplifier is set to on;

resetting the amplifier to off when the input level information exceeds a second threshold greater than the first threshold in the case where the amplifier is set to on, making a decision of setting the amplifier to off with respect to the reception channel while determining that the reception channel is receivable if the receivable/unreceivable state information indicates the receivable state in the case where the amplifier is reset to off, and determining that the reception channel is unreceivable if the receivable/unreceivable state information indicates the unreceivable state in the case where the amplifier is reset to off; and making a decision of setting the amplifier to on with respect to the reception channel while determining that the reception channel is receivable if the receivable/unreceivable state information indicates the receivable state when the input level information is not less than the first threshold and not greater than the second threshold in the case where the amplifier is set to on, resetting the amplifier to off if the receivable/unreceivable state information indicates the unreceivable state when the input level information is not less than the first threshold and not greater than the second threshold in the case where the amplifier is set to on, making a decision of setting the amplifier to off with respect to the reception channel while determining that the reception channel is receivable if the receivable/unreceivable state information indicates the receivable state in the case where the amplifier is reset to off, and determining that the reception channel is unreceivable if the receivable/unreceivable state information indicates the unreceivable in the case where the amplifier is reset to off.

3. A method of presetting a reception channel for an electronic apparatus comprising an input module configured to receive a television broadcast signal, a tuner configured to select a television broadcast signal of a target channel from television broadcast signals of channels receivable by way of the input module and to receive the selected broadcast signal, and an amplifier configured to be interposed between the input module and the tuner and to amplify the television broadcast signal supplied to the tuner, the method comprising:

setting the amplifier to off, making a decision of setting the amplifier to off with respect to the reception channel while determining that the reception channel is receivable if receivable/unreceivable state information included in reception status information of the television broadcast signal obtained from the tuner indicates a receivable state when input level information included in the reception status information exceeds a second threshold greater than a first threshold in the case where the amplifier is set to off, and determining that the reception channel is unreceivable if the receivable/unreceivable state information indicates an unreceivable state when the input level information exceeds the second threshold in the case where the amplifier is set to off;

resetting the amplifier to on when the input level information is less than the first threshold in the case where the amplifier is set to off, making a decision of setting the amplifier to on with respect to the reception channel while determining that the reception channel is receivable if the receivable/unreceivable state information indicates the receivable state in the case where the amplifier is reset to on, and determining that the reception channel is unreceivable if the receivable/unreceivable state information indicates the unreceivable state in the case where the amplifier is reset to on; and making a decision of setting the amplifier to off with respect to the reception channel while determining that the reception channel is receivable if the receivable/unreceivable state information indicates the receivable state when the input level information is not less than the first threshold and not greater than the second threshold in the case where the amplifier is set to off, resetting the amplifier to on if the receivable/unreceivable state information indicates the unreceivable state when the input level information is not less than the first threshold and not greater than the second threshold in the case where the amplifier is set to off, making a decision of setting the amplifier to on with respect to the reception channel while determining that the reception channel is receivable if the receivable/unreceivable state information indicates the receivable state in the case where the amplifier is reset to on and determining that the reception channel is unreceivable if the receivable/unreceivable state information indicates the unreceivable state in the case where the amplifier is reset to on.

4. An electronic apparatus comprising:
an input module configured to receive a television broadcast signal;

a tuner configured to select a television broadcast signal of a target channel from television broadcast signals of channels receivable by way of the input module, and to receive the selected broadcast signal;

an amplifier configured to be interposed between the input module and the tuner, and to amplify the television broadcast signal supplied to the tuner; and a preset module configured to determine whether each channel is receivable or unreceivable and to set on or off of the amplifier, wherein the preset module comprises:

a first determination module configured:
　to set the amplifier to off;
　to make a decision of setting the amplifier to off with respect to the reception channel while determining that the reception channel is receivable if receivable/unreceivable state information included in reception status information of the television broadcast signal obtained from the tuner indicates a receivable state when input level information included in the reception status information exceeds a second threshold greater than a first threshold in the case where the amplifier is set to off; and
　to determine that the reception channel is unreceivable if the receivable/unreceivable state information indicates an unreceivable state when the input level information exceeds the second threshold in the case where the amplifier is set to off;

a second determination module configured:
　to reset the amplifier to on when the input level information is less than the first threshold in the case where the amplifier is set to off;
　to make a decision of setting the amplifier to on with respect to the reception channel while determining that the reception channel is receivable if the receivable/unreceivable state information indicates the receivable state in the case where the amplifier is reset to on; and
　to determine that the reception channel is unreceivable if the receivable/unreceivable state information indicates the unreceivable state in the case where the amplifier is reset to on; and a third determination module configured:
　to make a decision of setting the amplifier to off with respect to the reception channel while determining that the reception channel is receivable if the receivable/unreceivable state information indicates the receivable state when the input level information is not less than the first threshold and not greater than the second threshold in the case where the amplifier is set to off;
　to reset the amplifier to on if the receivable/unreceivable state information indicates the unreceivable state when the input level information is not less than the first threshold and not greater than the second threshold in the case where the amplifier is set to off;
　to make a decision of setting the amplifier to on with respect to the reception channel while determining that the reception channel is receivable if the receivable/unreceivable state information indicates the receivable state in the case where the amplifier is reset to on; and
　to determine that the reception channel is unreceivable if the receivable/unreceivable state information indicates the unreceivable state in the case where the amplifier is reset to on.

* * * * *